United States Patent [19]

Matthews

[11] 3,935,882
[45] Feb. 3, 1976

[54] HYDRAULIC TANK RESERVOIR PRESSURE AND VACUUM STABILIZER SYSTEM

[75] Inventor: Ralph W. Matthews, New Berlin, Wis.

[73] Assignee: Caterpillar Tractor Co., Peoria, Ill.

[22] Filed: Feb. 19, 1974

[21] Appl. No.: 443,303

[52] U.S. Cl. ................................................. 138/30
[51] Int. Cl.² ......................................... F16L 55/04
[58] Field of Search.............................. 138/30, 31; 220/227–230; 60/325, 419

[56] References Cited
UNITED STATES PATENTS

| | | | |
|---|---|---|---|
| 2,278,688 | 4/1942 | Caminez | 138/30 |
| 2,564,711 | 8/1951 | Moyer et al. | 220/227 |
| 2,731,037 | 1/1956 | Schindler et al. | 138/30 |
| 3,076,479 | 2/1963 | Ottung | 138/30 |
| 3,092,969 | 6/1963 | Firth et al. | 60/419 |
| 3,741,250 | 6/1973 | Mercier | 138/30 |

*Primary Examiner*—Leonard D. Christian
*Attorney, Agent, or Firm*—Phillips, Moore, Weissenberger, Lempio & Strabala

[57] ABSTRACT

An hydraulic system comprising a displacement-type hydraulic element in communication with a sealed reservoir tank for receiving hydraulic fluid from and returning hydraulic fluid to the reservoir, and a stabilizer for preventing excessive vacuum and pressure from forming within the reservoir as fluid is moved into and out of the same. The stabilizer is carried within the reservoir tank and has a bellows construction for compensating for change of volume in the reservoir as fluid changes take place therein, and the stabilizer is vented to the atmosphere through a breather system constructed to minimize entrance of dirt and the like within the stabilizer.

2 Claims, 2 Drawing Figures

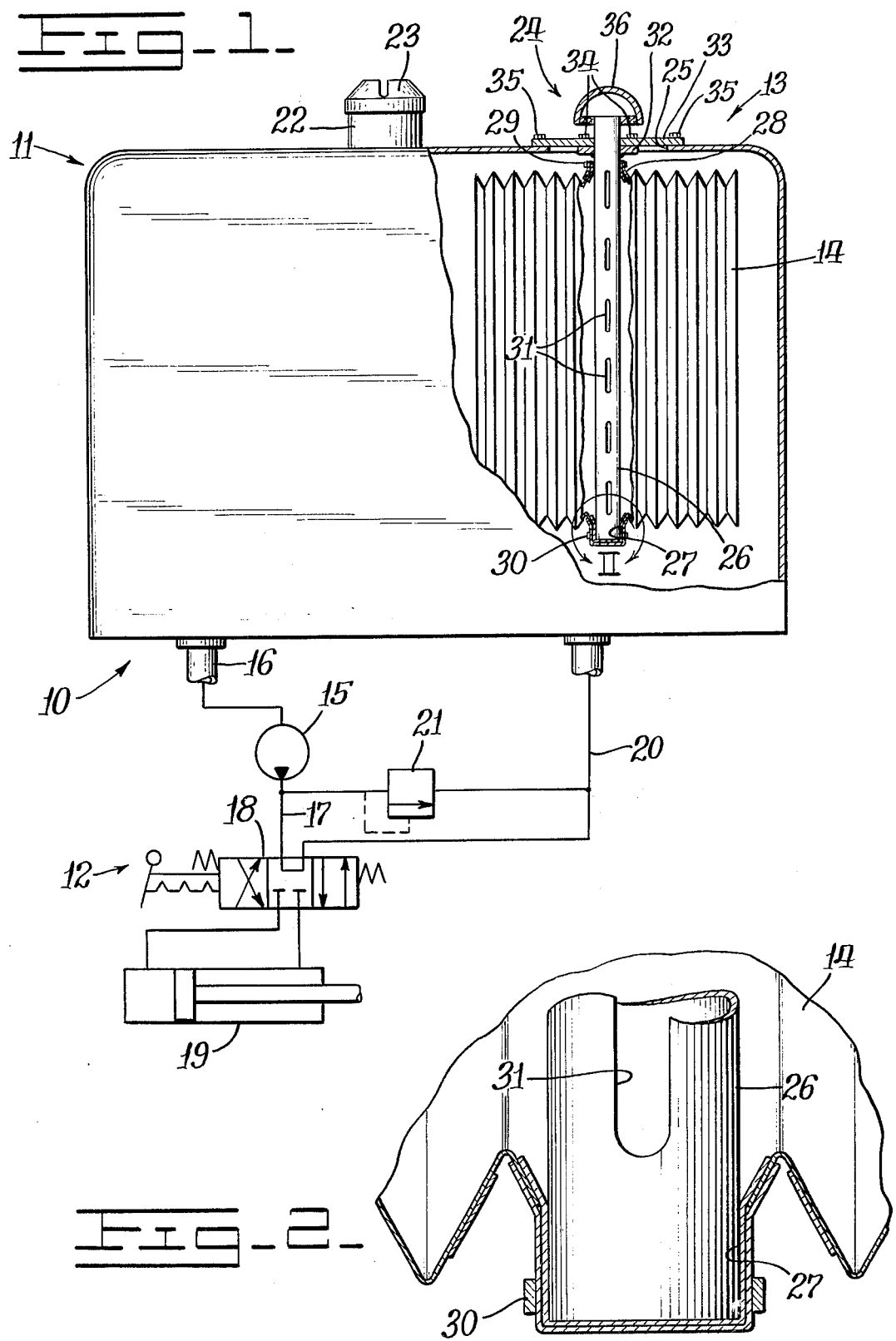

HYDRAULIC TANK RESERVOIR PRESSURE AND VACUUM STABILIZER SYSTEM

BACKGROUND OF THE INVENTION

The present invention relates to a hydraulic tank reservoir pressure and vacuum stabilizer system, and more particularly to such an hydraulic system utilizing a displacement-type hydraulic element adapted to receive fluid from and return fluid to the reservoir.

Hydraulic tanks commonly have an air space provided therein to compensate for the changes in the volume of hydraulic fluid that occurs during operation. For example, when the hydraulic tanks are used with hydraulic jacks, the volume of fluid in the tank fluctuates as the jacks are retracted or extended.

In order to prevent pressure buildup or the creation of a vacuum within the tank, many of the earlier hydraulic systems had the air space communicating with the atmosphere through a vent or the like. However, one of the drawbacks of such vented systems was that the air moving in and out of the tank during operation carried in dust particles and water vapor, which materials became entrapped within the fluid. Even though a breather filter was used in certain systems, dust and water vapor still accumulated within the fluid. Accordingly, such systems have not been entirely satisfactory.

In order to prevent the contamination of the fluid by airborne particles, some of the recent hydraulic systems utilized a sealed hydraulic tank reservoir. However, tank size must be greatly increased to obtain adequate air volume so that the pressure differentials within the tank which occur during operation are minimized. The increased size of the tank takes up valuable space in the vehicle and frequently reduces operator visability. Thus, it is seen that an improved hydraulic tank is needed for use in a system having a displacement-type hydraulic element in communication with the tank, which will enable fluid to move into and out of the tank without substantially changing the air pressure therein, yet which has provision for positively preventing particle and water contamination of the hydraulic fluid.

SUMMARY OF THE INVENTION

Thus, it is a primary object of the present invention to provide an improved hydraulic system utilizing a tank reservoir in combination with a displacement-type hydraulic element operating with fluid taken from said reservoir, together with a pressure stabilizer capable of maintaining the tank reservoir at near atmospheric pressures without unduly increasing the size or complexity of the structure.

The stabilizer is in the form of a variable volume container having common wall means with the tank reservoir so that changes in volume of the reservoir may be compensated by equal and opposite changes in volume in the stabilizer. In its broad aspect, the stabilizer simply needs to have one wall in common with the tank reservoir, but in the preferred form of the invention the stabilizer will be carried within the hydraulic tank reservoir and have a major portion of the stabilizer walls flexible. The hydraulic tank is then completely sealed so as to prevent unwanted foreign matter and water vapor from entering and contaminating the hydraulic fluid. The stabilizer, on the other hand, is vented to the atmosphere, preferably through a vertically extending breather which must move upward and downward and go through a typical air filter screen. In this way, changes in volume within the tank reservoir will cause corresponding movement of the flexible walls in stabilizer, and air will move into or out of the stabilizer as required.

Although the invention will be described in detail in connection with a hydraulic jack, it will be appreciated that any displacement-type hydraulic element will combine favorably in operation with the stabilizer of this invention. For example, typical vehicular hydraulic brake systems may have their reservoir tank equipped with a stabilizer so that the tank may be completely sealed. Thus, in its broad aspect, the the invention embraces such hydraulic brake units.

It will also be appreciated that multiple elements may operate from the same reservoir tank, and that such a system is still within the scope of the invention. For example, a plurality of hydraulic jacks could be used in combination with a single reservoir tank equipped with the stabilizer in accordance with this invention.

Another object of the invention is the provision of an hydraulic system having a stabilizer of the character described, which comprises an accordion-type flexible air bag disposed within the hydraulic tank and in communication with the atmosphere through a central rigid tube extending through a wall of the tank.

With this construction, the rigid tube will prevent complete collapse of the accordion-type air bag and maintain continuous venting with the atmosphere. In its preferred form, the rigid tube will extend through the top wall of the tank and be equipped with a cap element providing for a downwardly-extending exterior for the vent passage. This has the advantage of minimizing entry of foreign material into the stabilizer, although it will be appreciated that entry of water vapor and a minimum amount of dust and the like may enter the stabilizer without great harm. This is made practical by having the stabilizer in sealed relation to the reservoir tank.

A further object of the invention is to provide an hydraulic system having a stabilizer of the character described in which the stabilizer has sufficient resiliency to resist collapsing due to the pressure generated by the weight of the hydraulic fluid within the tank.

With this preferred construction, the tank may be filled and sealed by tightly closing the cap with the stabilizer in condition to take up any excess pressures that may occur during operation of the hydraulic system. In this way, the stabilizer will completely protect the tank, yet allow the tank to be sealed and be constructed of a relatively small size. In addition, filling may be achieved without retracting the hydraulic jacks or the like.

BRIEF DESCRIPTION OF THE DRAWINGS

A preferred form of the invention is illustrated in the accompanying drawing forming a part of this description, in which:

FIG. 1 is an elevational view of an hydraulic system constructed according to this invention in partly schematic form, but with the reservoir tank shown and with parts broken away to illustrate internal structure; and FIG. 2 is an enlarged sectional view of the lower portion of the stabilizer shown partly in section.

While only the preferred form of the invention is shown, it should be understood that various changes or modifications may be made within the scope of the claims attached hereto without departing from the spirit of the invention.

DETAILED DESCRIPTION OF THE PREFERRED EMBODIMENT

Referring to the drawing in greater detail, there is shown in FIG. 1 an hydraulic system 10 comprising a reservoir tank 11, and a displacement-type hydraulic mechanism 12 in communication with said tank for receiving hydraulic fluid from and returning hydraulic fluid to said tank. In accordance with the invention, the tank 10 is equipped with a stabilizer 13, and, as here shown, the stabilizer is in the form of a flexible bag 14 carried completely within the hydraulic tank 11.

Referring again to the hydraulic system 12, as here shown, the system includes a pump 15 which draws fluid from the tank through a conduit 16 and delivers pressurized fluid through a conduit 17 to a control valve 18. The control valve 18 is selectively actuable to direct the pressurized fluid to either the head end or the rod end of a hydraulic jack 19. In the neutral position shown, the fluid flow from the pump 15 is directed through a drain conduit 20 back to the tank 11. A relief valve 21 is interconnected between the conduits 17 and 20 for preventing excessive pressure buildup in the hydraulic system. It will be appreciated that the hydraulic mechanism shown is more or less conventional, and further description is considered unnecessary. It will also be appreciated that other displacement-type mechanisms may be substituted for that shown and still be within the scope of the present invention. In addition, although only a single control valve hydraulic jack is shown, a typical hydraulic system may have several hydraulic jacks controlled by a single control valve and/or several control valve and hydraulic jack combinations. Any of these systems will also be within the scope of the invention.

The hydraulic tank 11 is a closed container having a valve spout 22, which is normally sealingly closed by a removable cap 23. It is an important feature of this invention to provide a tank which is completely sealed from the atmosphere, and therefore there are not vents or other structures open to the air that might cause internal contamination.

The sealed tank is made large enough to provide sufficient hydraulic fluid for operation of the associated hydraulic equipment, but no extra size for an air dome is required, because substantially atmospheric pressure is maintained within the tank by operation of the stabilizer 13, which preferably comprises the flexible bag 14 as indicated above.

As here shown, the flexible bag 14 is an accordion-type air bag completely disposed within the reservoir tank 11, except for vent means 24. In order to provide for assembly and accomodate the air bag, an aperture 25 is provided in tank 11 for receipt of stabilizer 13. Vent means 24 is then provided at the upper end of an elongated tube 26, which is constructed for receipt of air bags 14. Thus, the tube 26 has its lower end nested within a circular cavity 27 formed in air bag 14, and with its upper end fitting through a neck portion 28 of bag 14. The bag is then secured to the tube 26 by means of a pair of hose clamps 29 and 30. The tube 26 has a plurality elongated slots 31 for effecting communication between the inside of the tube and the inside of the air bag 14. The upper end of tube 26 extends through aperture 25 and communicates to the atmosphere through vent 24 for completing the communication between the atmosphere and the inside of air bag 14. The aperture 25 is sized large enough to insert the entire stabilizer 13 therethrough for assembly thereof. In order to secure the stabilizer sealingly within tank 11, tube 26 is provided with a mounting flange 32, and attached to a connecting plate 33 by means of bolts 34, with the plate being connected in turn to the tank 11 by means of bolts 35. In this way, the stabilizer 13 is easily inserted and attached in sealing relation within tank 11.

Breather 24 generally comprises a cap 36 adapted to fit over the top of tube 26 and protect the tube opening from entry of undue amounts of foreign material. In addition, the cap is formed to direct entering air upwards. If desired, cap 36 may be provided with a suitable screen or the like in order to further filter dust and the like from entering air at the opening thereof. However, it will be appreciated that certain amounts of dust and moisture may enter stabilizer 13 without in any way contaminating the hydraulic fluid, because the stabilizer interior is completely sealed from the general interior of the tank reservoir 11.

In operation, when the tank 11 is filled with hydraulic fluid, the hydraulic jack 19 is in its retracted positions. In the case of a multiple hydraulic jack arrangement, all of such jacks are retracted prior to filling the tank with hydraulic fluid. When the tank is completely filled, the cap 23 is sealingly secured to fill spout 22 in the usual manner.

During the filling process, the pressure generated by the weight of the oil will partially collapse or squeeze the bag so that a minimum of air is contained within the bag. Thereafter, extending the hydraulic jack 19 during operation causes a predetermined volume of oil to be taken from the tank and tends to create a slight vacuum therein. However, with the tube 26 and air bag 14 being open to the atmosphere, the bag will expand due to the differential in pressure to compensate for the volume of the fluid taken from the tank. The air bag is provided with a capacity sufficient that it exceeds the volume of fluid taken from the tank when the hydraulic jack or jacks are fully extended. When the hydraulic jack or jacks are again retracted, the increased volume of fluid again squeezes the air bag to its collapsed position. Since the inside of the air bag is sealingly separated from the hydraulic fluid, any air-borne particles or moisture drawn into the air bag during the exchange of air contained within the air bag cannot contaminate the hydraulic fluid.

In the operation just described, it is seen that the hydraulic jack or jacks should be in the retracted position during the filling of the reservoir. Since operators cannot be relied upon to observe such procedures, it is preferred to utilize a stabilizer which may be filled with a hydraulic jack fully extended. This may be achieved by providing an air bag having sufficient resiliency to resist collapsing due to the pressures exerted by the weight of the oil. In other words, the bag is allowed to collapse partially, but retains sufficient collapsing volume to compensate for the situation where the reservoir is filled with the hydraulic jack 19 fully extended. Thus when the jack is retracted, the increased volume of hydraulic fluid entering the tank generates a slight pressure sufficient to cause the air bag to collapse, expelling air from the bag. When the hydraulic jack is again extended and the volume of fluid within the tank decreases, the air bag will expand in direct proportion to the volume of fluid taken from the tank. With this form of the invention, it will be appreciated that the reservoir may be filled and designed to be operative in all cases, whether the hydraulic jack or jacks are fully extended or retracted upon filling the same.

From the foregoing description, it is seen that an improved hydraulic system is provided in which the fluid is completely protected from contamination by being carried in a sealed reservoir, yet which contains a stabilizer enabling the reservoir to be made with minimal size and yet be completely fool-proof in operation.

What is claimed is:

1. In an hydraulic system comprising a sealed reservoir tank, and a displacement-type hydraulic element in communication with said tank for receiving hydraulic fluid from and returning hydraulic fluid to said sealed reservoir tank; a stabilizer means for changing the volume of the sealed reservoir tank in response to fluid requirements of the displacement type hydraulic element, the stabilizer means comprising an accordion type air bag having walls defining a variable volume chamber, at least one of said walls being movable and having its outer surface in communication with the interior of said sealed reservoir tank, said air bag being formed with sufficient resiliency to resist complete collapsing by the pressure generated from the weight of hydraulic fluid in the sealed reservoir when said sealed reservoir is filled, vent means for providing ingress and egress of ambient atmospheric air into and out of the variable volume chamber allowing substantially atmospheric pressure to be maintained in the sealed tank; the stabilizer means further comprising an elongated tube extending from the vent means, said tube being rigid and having one or more passages establishing communication between the inside of the tube and the inside of the variable volume chamber, said elongated tube having a portion thereof extending outwardly of said tank, roof means supported over said portion, said roof means being formed to direct air entering therein upwardly and then downwardly into said tube whereby movement of solid particles into the stabilizer means is minimized.

2. An hydraulic system as defined in claim 1 wherein the roof means is secured to said tube portion.

* * * * *